United States Patent Office

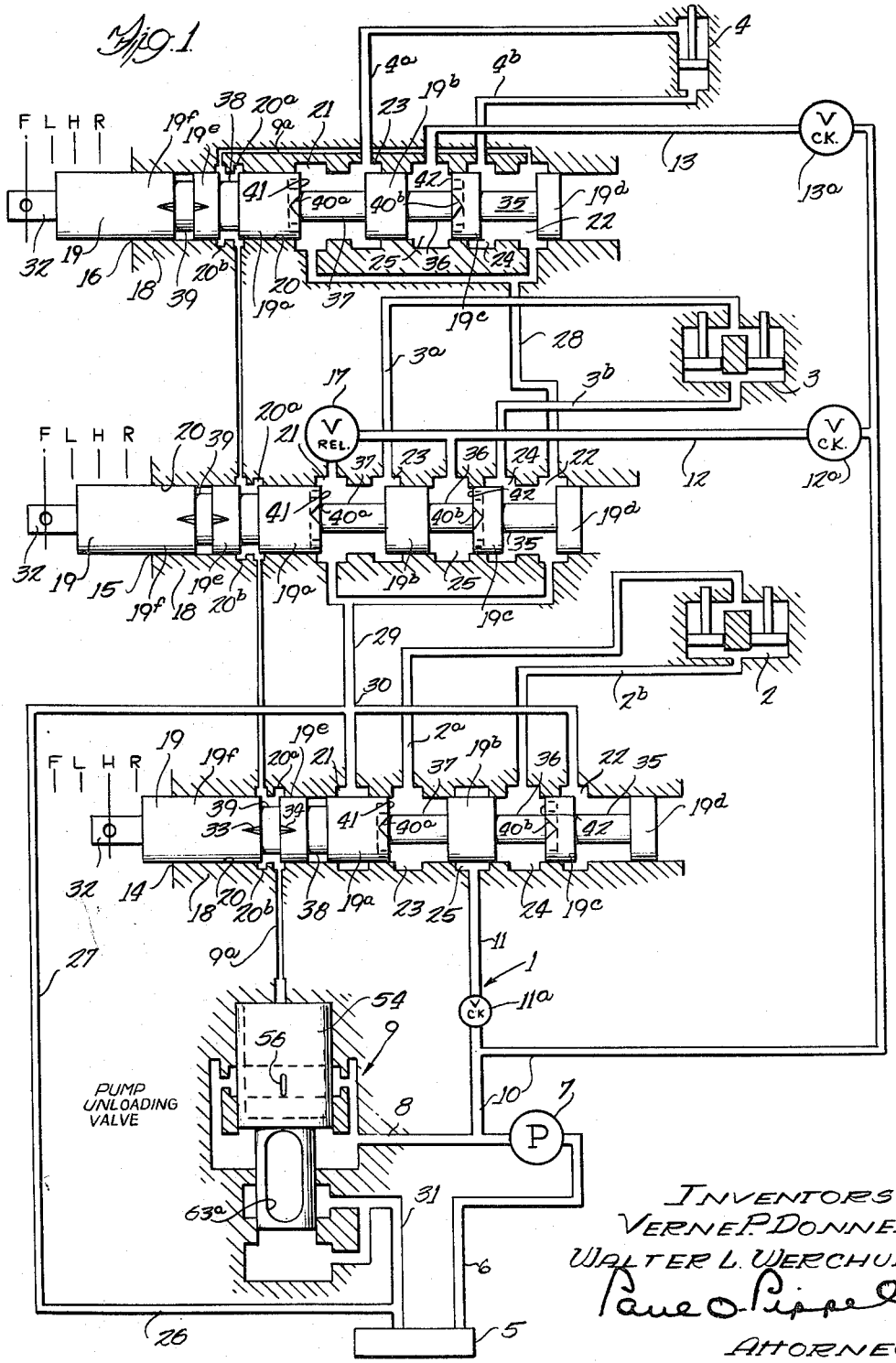

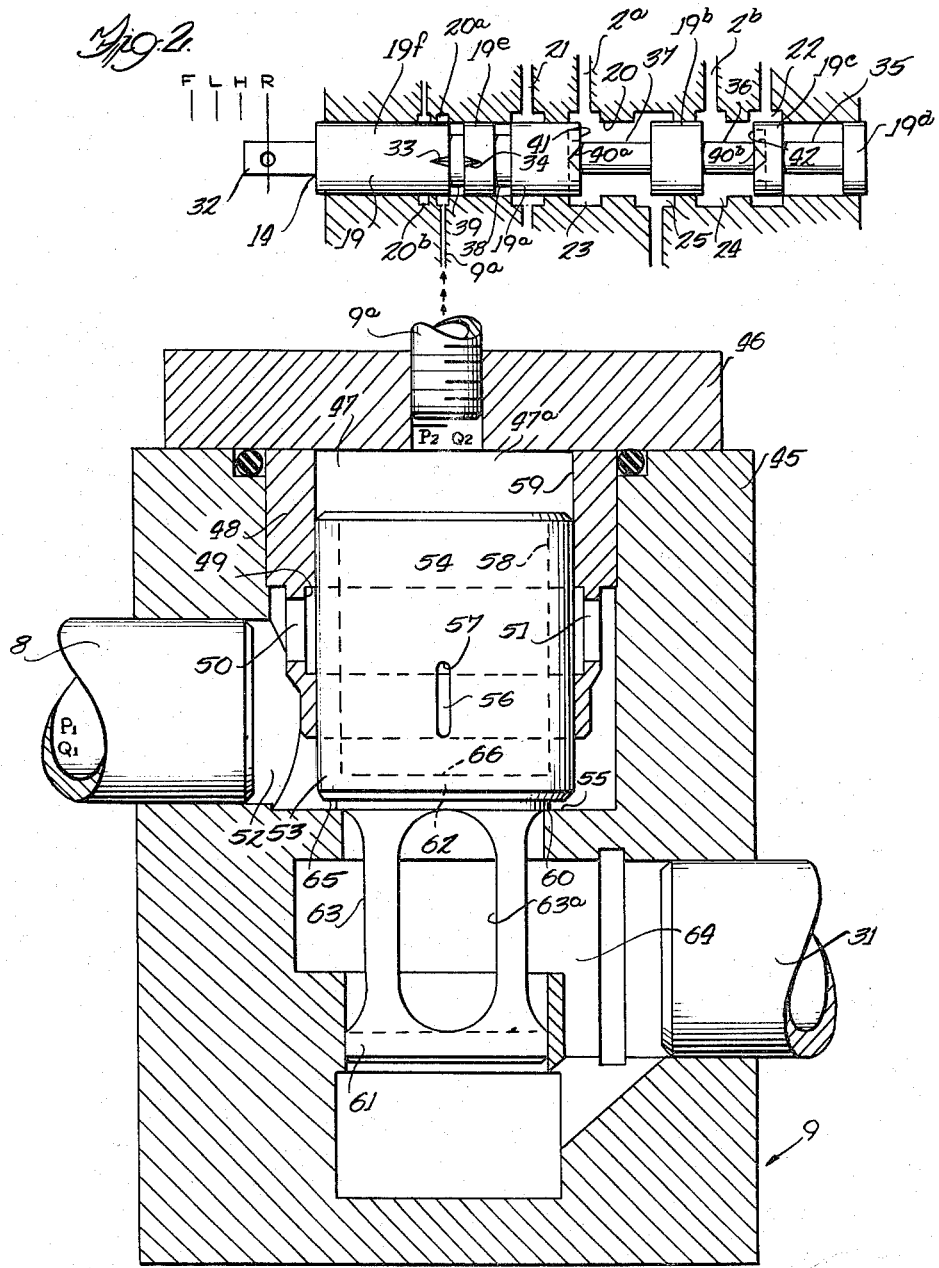

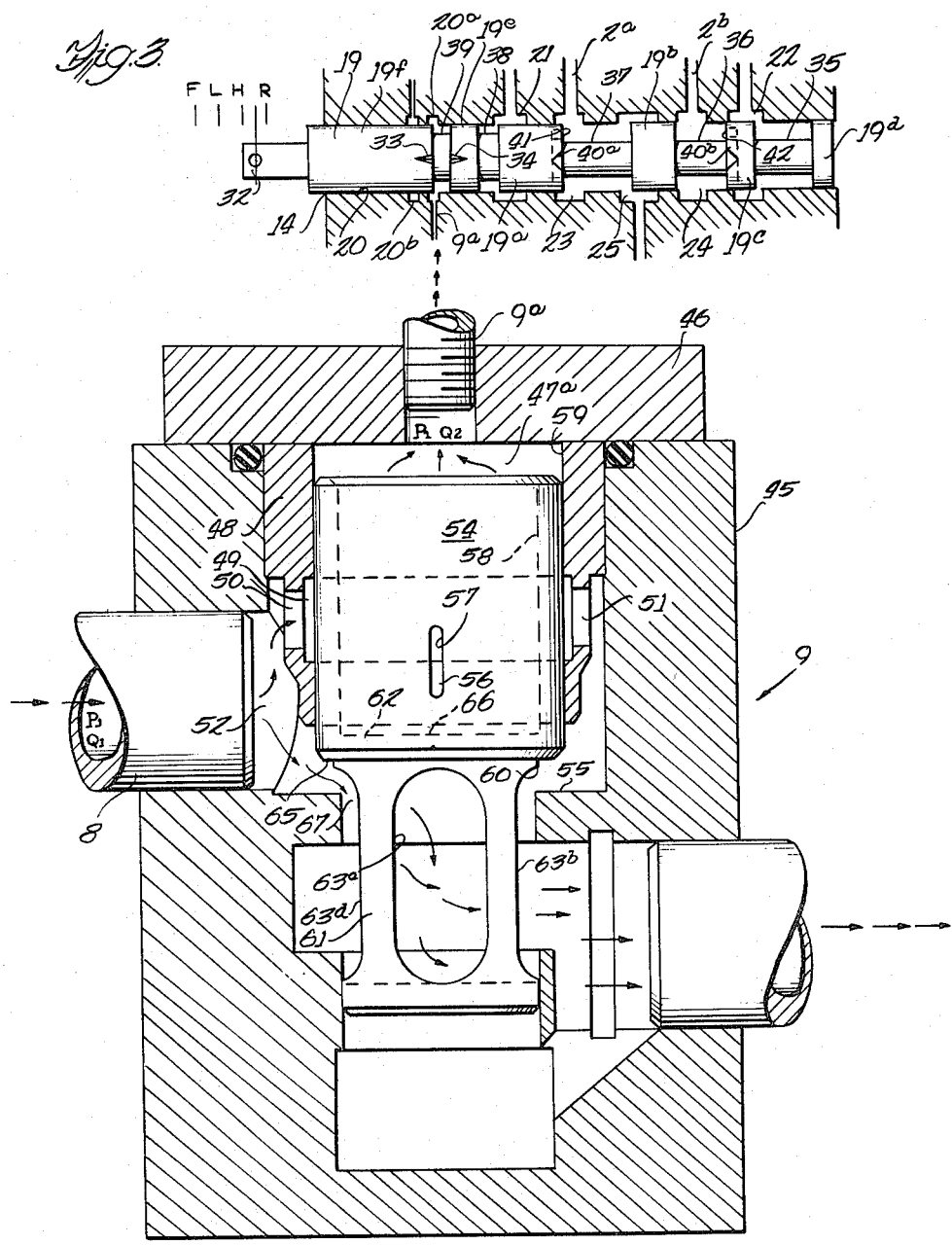

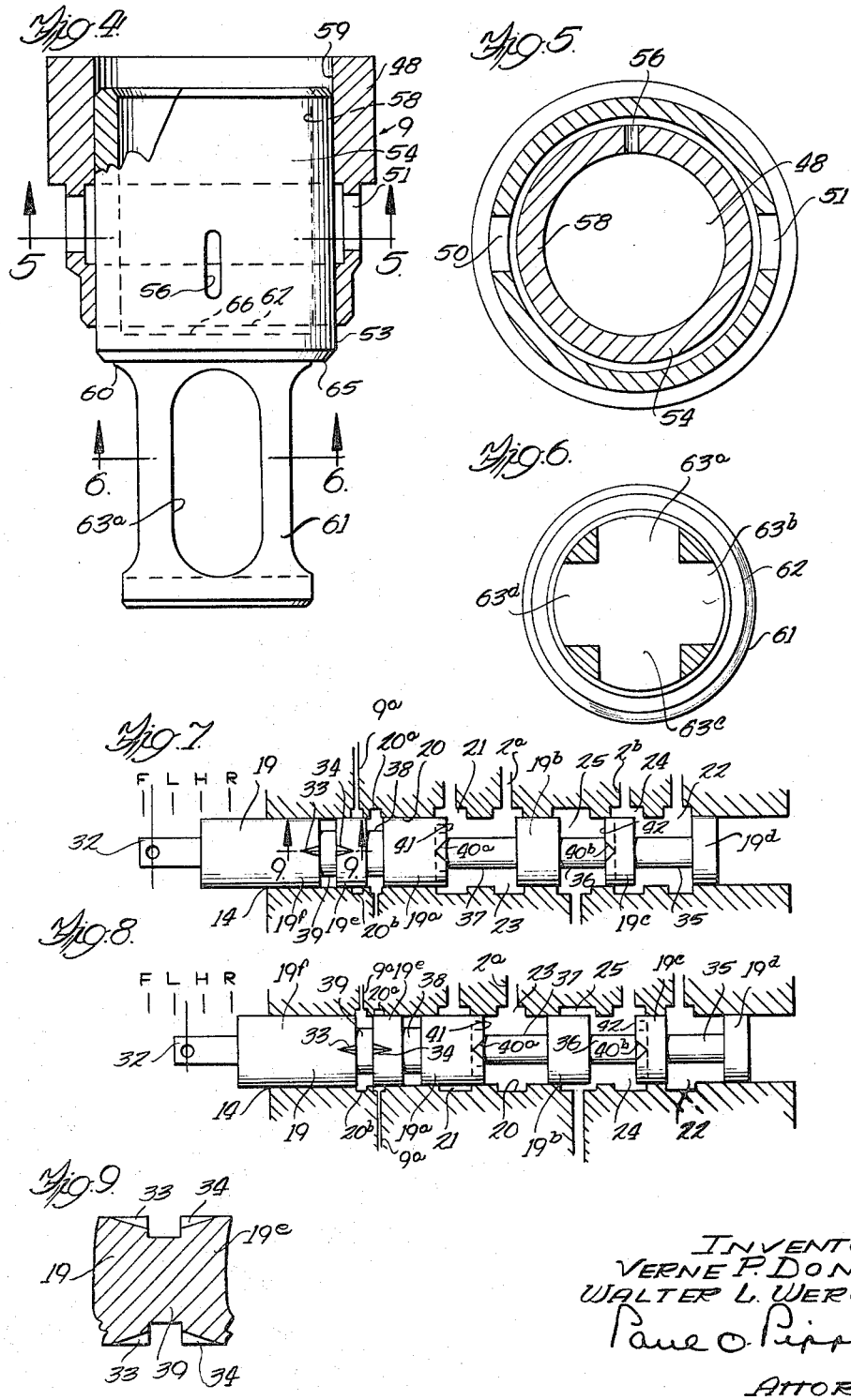

3,175,800
Patented Mar. 30, 1965

3,175,800
HYDRAULIC CONTROL SYSTEM AND UNLOADING VALVE THEREFOR
Verne P. Donner, Palatine, and Walter L. Werchun, Chicago, Ill., assignors to International Harvester Company, Chicago, Ill., a corporation of New Jersey
Filed June 20, 1961, Ser. No. 118,304
4 Claims. (Cl. 251—35)

This invention relates to a hydraulic control system for operation of mechanism and valve means therefor and particularly relates to a hydraulically closed center system employing a fluid pressure responsive unloading valve.

Hydraulic systems for supplying fluid under pressure for operating various types of implements that are currently manufactured have the disadvantage of not being able to effectively operate these various hydraulically actuated implements since each particular implement has a different fluid pressure requirement for its operation. Also, a gradual control of the high pressure fluid delivered to the implements for its operation depending on the load demand, is difficult to obtain in the presently designed hydraulic system. Further, different types of control valves are required for different types of implements. Under the construction disclosed by this invention various types of control valves may be used in the same system with one another for operating a number of various implements having different load capacities and the hydraulic fluid pressure may gradually be applied to or removed from each implement in accordance with the load demand. Such an inventive design is readily adaptable for operation of scrapers, dozers and other allied equipment by using one hydraulic circuit; gradual hydraulic fluid pressure may be supplied by the pump to the implement by the employment of a novel dump or unloading valve having a variable openable and closable controlled port.

It is therefore an object of this invention to provide a novel hydraulic control system capable of providing hydraulic energy to hydraulically operated equipment as desired and a novel valve means therefor.

Another object of this invention is to provide a hydraulic control system for delivery of hydraulic fluid under pressure to one or more hydraulically actuated units gradually and as required by each unit by the employment of a novel unloading valve which is capable of delivering the fluid either to the hydraulic equipment or to a fluid reservoir or to both.

Another object of this invention is to provide an unloading valve which has a variable orifice for controlling the delivery of hydraulic fluid under pressure to associated hydraulic equipment or to a reservoir or to both.

It is another object of this invention to provide a hydraulic control circuit employing a pump and a reservoir and a plurality of hydraulically operated units in circuit with the pump and reservoir, and providing in the system a novel unloading or dump valve having a series connection with a complementary number of hydraulic unit control valves for operating each of the hydraulic units respectively.

A further object of this invention is to provide a novel unloading valve having a variable orifice for controlling the flow of fluid in an associated pilot line in series with a plurality of hydraulic control valves movable to operate respective hydraulically controlled units for supplying hydraulic fluid under pressure to the unit or to a reservoir or both as required.

Still another object of this invention is to provide a hydraulic system comprising a pump and reservoir, a plurality of hydraulically actuated units, a plurality of respective control valves for each hydraulic unit, and conduit means interconnecting the control valves, the hydraulic units and the reservoir and pump, and an unloading valve means provided with a variable orifice and having a pilot line in series with each of the control valves and the reservoir, and each of the control valves being notched to provide finely adjustable characteristics for gradual hydraulic operation of the unit in accordance with the positioning of the unloading valve allowing bypass of hydraulic fluid to the reservoir.

These and other objects will become more apparent from a reference to the attached drawings and the following description, it being understood that such drawings and description are not to be construed as a limitation upon the breadth and scope of the appended claims, wherein:

FIGURE 1 shows the novel pump-supplied, hydraulic system employing three hydraulic control valves, three hydraulic units respectively operated thereby, a pump unloading valve, a pilot line leading from the unloading valve, and pilot valve portions hydraulically connected in series in said pilot line and each connected to and associated with a different one of the control valves, for operating the unloading valve to bypass the supply pump in response to operation of the associated control valve;

FIGURE 2 shows an enlarged view of the unloading valve partly in section and a control valve in the raised position;

FIGURE 3 shows an enlarged view partly in section of the unloading valve unseated and a control valve placed between the hold and raised positions thereof;

FIGURE 4 shows a partial view of the unloading valve partly in section and removed from its housing;

FIGURE 5 is a cross-sectional view of the unloading valve taken along line 5—5 of FIGURE 4;

FIGURE 6 is a cross-sectional view of the unloading valve taken along line 6—6 of FIGURE 4;

FIGURE 7 is a view partly in section of the control valve between the float and the lower positions;

FIGURE 8 is a view partly in section of the control valve placed between the lower and hold positions; and, FIGURE 9 is a sectional view of the control valve stem taken along line 9—9 of FIGURE 7 and illustrating the two sets of notches on the valve stem placed 180° apart from one another.

With reference now to the drawings and in particular to FIGURE 1 there is shown a hydraulic control system 1 for the operation of implements such as a dozer, scraper, or other hydraulically operated equipment or units which may be used on a vehicle of the crawler tractor type and is indicated schematically as dozer lift cylinders 2, auxiliary circuit cylinders 3, and remote circuit cylinders 4, each of which may be operated independently of one another or two or more may be used simultaneously.

The system 1 has a reservoir or tank 5 with a line 6 leading to a pump 7 having a feeder line 8 leading to an unloading or dump valve 9 and a feeder circuit 10 with feeder branches 11, 12 and 13 leading to hydraulic control valves 14, 15 and 16 respectively for operation of hydraulic cylinders or units 2, 3 and 4 respectively. It will be appreciated that any number of control valves may be used for operating any number of hydraulic cylinders or jacks and for purposes herein three such control valves have been shown. The construction, function and operation of each of the control valves are identical to one another and it also will be appreciated that one control valve may be of a different size than another depending on the type of hydraulic equipment being used. An explanation of one of the control valves' operation will therefore suffice for the operation of the other control valve.

Each of the feeder lines 11, 12 and 13 have a check valve 11a, 12a and 13a for controlling the flow of the fluid in one direction toward each of the control valves 14, 15 and 16, said check valves 11a, 12a and 13a being unseated upon an increase over a predetermined fluid pressure value. A pressure relief valve 17 in feeder line 12 will allow the fluid in the feeder circuit 10 to drain to the reservoir 5 should excessive pressure develop in the circuit 10. Each valve 14, 15 and 16 has a valve housing or cylinder 18 and a valve spool or stem 19 manually reciprocal within the chamber 20 of the housing 18. The valve chamber of each of the valves 14, 15 and 16 is divided into a plurality of chamber sections or enlarged annular areaways, namely, drain chamber sections 21 and 22, a raise chamber section 23, a lower chamber section 24 and a feeder chamber 25. The feeder chamber 25 of each valve communicates with the respective feeder lines 11, 12 or 13. The raise annular areaway 23 of each of the valves communicate with the raise line 2a, 3a or 4a which in turn communicate with the respective hydraulic jack 2, 3 or 4 for raising or moving the respective implement in one direction and the lower chamber section or annular areaway 24 of each of the valves communicate respectively with the lower lines 2b, 3b or 4b which in turn communicate with the hydraulic units 2, 3 or 4 for lowering or moving the respective implement in the opposite direction.

A drain circuit 26 is provided with a main drain line 27 for draining the fluid from the hydraulic units and their respective control valves back to the sump or tank 5, the main drain line 27 having a drain line 28 and drain chamber section 22 of valve 15 for draining fluid from drain chamber sections 21 and 22 of valve 16, drain line or conduit 29 for drain of fluid from drain chamber sections 21 and 22 of valve 15, and drain line 30 for draining fluid from drain chamber sections 21 and 22 of valve 14, the drain lines 28, 29 and 30 all emptying into main drain line 27 back to the reservoir 5. A drain line 31 leading from the unloading valve 9 receives the pumped fluid bypassed through the valve 9 and returns it to the tank 5.

The spool 19 of each motor control valve has an extension 32 at its left end connected to manual control means (not shown) for shifting the control valve spool 19 into float (F), lower (L), hold (H) and raised (R) positions as indicated in FIGURES 1, 2, 3, 7 and 8. Each spool 19 has lands 19a, 19b, 19c and 19d for controlling the communication of the fluid between the chamber 20 and the various chamber sections or annular areaways 21, 22, 23 and 24, respectively. The land 19a acts in conjunction with a land 19e and annular grooves 20a and 20b of each motor control valve for controlling the flow of fluid through a pilot line 9a leading from the unloading valve 9 through the just-named series-connected portions of the motor control valves 14, 15, and 16. The last section 9a of the pilot line is connected between the annuli 20b and 22 of motor control valve 16, and communicate with the reservoir 5 in a fluid drain path including the annulus of annular areaway 22 of the valve 16, line 28, annular areaway 22 of valve 15, line 29 and line 27.

In each motor control valve, the spool 19 has two diametrically opposite, tapered notches 33 formed in the land 19f, and two diametrically opposite, tapered notches 34 formed in the land 19e. Lands 19c and 19d are separated by reduced diameter portion 35, lands 19b and 19c by reduced diameter portion 36, lands 19a and 19b by reduced diameter portion 37, lands 19e and 19a by reduced diameter portion 38, and lands 19e and 19f by reduced diameter portion 39.

It will be appreciated that the positioning of one or more of these control valves 14, 15 or 16 will determine whether its respective hydraulic unit 2, 3 or 4 is permitted to float, to be lowered or to be held in hydraulic lock or to be raised and that the control of the fluid supply from the pump is also affected by the position of the control valves 14, 15 or 16 by controlling flow of fluid through the pilot line 9a and the unloading valve 9. Further notches 40a and 40b are located respectively in the right side 41 of land 19a and the left side 42 of land 19c.

With reference to FIGURES 2 through 6, it is seen that the unloading valve or bypass valve 9 comprises a housing 45 having a cover 46 in which is formed the beginning of the pilot line 9a which communicates with the interior chamber 47 of the valve housing 45 and has at its upper end a hollow sleeve 48 entrained against the cover 46 and within the housing 45 and the sleeve 48 has an annular cavity 49 with ports 50, 51 communicating with feed chamber or inlet 52 which in turn communicates with pilot feeder line 8 from the pump 7. A poppet valve member 53 has an upper hollow portion 54 reciprocable within the sleeve 48 between the cover 46 and a shoulder or seat 55 of the housing 45 and has a slot 56 forming a variable orifice 57 with the annular cavity 49 for communication of fluid between the feed chamber 52 and the pilot chamber 47a formed by the inner wall 58 of a poppet head 54, the inner wall 59 of the sleeve 48 and the cover 46.

The cover 46 acts as an upper limit or travel for the poppet valve 53 and the seat 55 of the housing 45 acts as the lower limit of travel for the poppet valve 53 by having poppet shoulder portion 60 engage seat 55. The lower part 61 of the poppet valve 53 comprises a tubular extension having a wall 62 separating it from the upper hollow poppet portion 54 and having four enlarged slots 63a, 63b, 63c and 63d communicating its interior with poppet drain chamber 64 and poppet drain line 31 of the cavity 47. Thus it is seen that the poppet valve 53 divides the chamber 47 into the pilot chamber section 47a, a pilot feed chamber section 52 and a pilot drain chamber section 64.

The pilot feed chamber 52 is always in communication with the pilot line chamber 47a, even when the poppet shoulder portion 60 of the valve is seated against the shoulder 55 as shown in FIGURE 2, because of the port 50 and the variable orifice 57 but the pilot drain chamber 64 is in communication with the pilot feed chamber 52 only when the poppet shoulder portion 60 is off its seat 55 at which time the pump feed line 8 is open to the drain line 31. At that time the feed chamber 52 dumps its fluid into the drain chamber 64 by way of the enlarged slot 63a, 63b, 63c and 64d. The higher the poppet valve 53 rises the less is the restriction of fluid from the feed chamber 52 to drain chamber 64 and when the poppet valve 53 is all the way up where it is seated against the cover 46 full pump flow is sent by way of feeder line 8 and unloading valve 9 back to drain line 31 and tank 5 without supplying any fluid to the hydraulic units 2, 3 or 4 and at which time the variable orifice 57 has its maximum opening as shown in FIGURE 1. When the poppet valve 53 is only half way up from its seat as shown in FIGURE 3 or FIGURE 4 approximately 50% of the fluid is used to operate the hydraulic units 2, 3 or 4 and 50% is sent back to the reservoir 5 and the variable orifice 57 has an increased size over that shown in FIGURE 2 but less than that shown in FIGURE 1.

The longitudinally extending hollow portion 54 and the transverse wall 62 form a pressure movable piston structure, the closed end thereof including a backside 66 of the wall 62 in valve 9.

For an understanding of the operation of this unloading valve consider the pressure flowing through line 8 as P1, the quantity of fluid as Q1, the pressure in pilot 9a as P2, and the quantity of fluid therein as Q2. Consequently when the "bleed-off" or pilot line 9a is closed, the valve 9 is closed. In the closed position, the slot 56 of the poppet valve 53 is partly uncovered by the sleeve 48. Pressure P2 at the back side 66 of the poppet 53 is equalized by the variable opening or orifice 57 with the pump or line pressure P1 and this condition presses the poppet shoulder portion 60 of the valve against the seat 55, thus securing the closed position of the valve 9.

The opening of the "bleed-off" connection or pilot line 9a results in a flow from the back side 66 of the poppet 53 and a pressure drop from P1 to P2. The displaced volume of liquid and differential pressure P1−P2 moves the poppet 53 up from the closed position. At the same time a larger area of the slot 56 will be uncovered, thus increasing the flow Q1 between the pressure P1 and P2. At the moment at which the flow rate Q1 establishes equilibrium by exactly equaling the flow Q2 to the "bleed-off" or pilot line 9a, the poppet 53 will be hydraulically balanced and dynamically hold its position. Liquid will be dumped to the partly opened valve portion 61 and a new line pressure P1 will be set. Any further opening of the "bleed-off" line 9a will displace more liquid from the back side of the poppet 53. This will result in further lifting of the poppet 53 and consequently, will result in uncovering a larger area 57 of the slot 56, thus reducing the pressure P2 and increasing the flow Q1, until a new dynamically balanced state is obtained. Maximum opening of the "bleed-off" area or pilot line 9a lifts the poppet 53 all the way up against cover 46 and provides the maximum opening 67 of the valve 9.

A gradual closing of the "bleed-off" area or pilot line 9a will result in a reverse process, producing a gradual closing of the valve 9 and gradual increasing of the line pressure P1. This valve closure occurs under the circumstances described, despite the fact that a longitudinally acting pressure area 65 communicates with the fluid in the feed chamber or inlet 52 of the valve 9 and acts at all times in a direction opposing valve closure.

It will be noted a further feature of the elongated slot or opening 56 is that in the full open position of the slot 56, there is a maximum entrance area through the slot 56 to rapidly charge the back side of the poppet 53 resulting in a fast closure of the valve. In other words, this valve has a fast snapping action plus the ability to gradually increase or "feather" the pressure flow condition as demanded.

This type of unloading valve 9 is conducive to a closed center system, that is, a system where pump pressure is blocked by a control valve such that no fluid reaches the hydraulic unit. The fluid from the pump can thus be delivered by the unloading valve 9 back to the reservoir or can be supplied as desired to other hydraulic units. Fluid is handled in this manner without causing frothing or heating of the fluid such as could occur in an open center system if the pump were continuously sending fluid to the control valves in that open center system even though the fluid were not directed to the hydraulic units for their operation. The hydraulic system 1 as show in FIGURE 1 is such a closed center hydraulic system.

Correlating this type of unloading valve 9 to the hydraulic system 1 when one or more of the control valves completely block the pilot line 9a, a minimum size orifice 57 exists and the poppet 53 is closed permitting all of the fluid under pressure from the pump to be delivered to one or more of the hydraulic units. This situation exists when one or more of the control valves are in the raised or lowered positions. FIGURE 2 illustrates the control valve in the raised position with a minimum variable orifice 57.

The float and hold positions as shown in FIGURE 1 illustrate the situation where the variable orifice 57 has a maximum opening, the poppet 53 being in its fully up position, the full pump flow being directly back to the reservoir by way of the unloading valve 9, and the pilot line 9a having unrestricted flow to the reservoir 5. This is because each of the control valves have either their reduced diameter portion 39 or 38 (39 for hold position or 38 for float position) midway of the annular areaway 20a and 20b which in turn are connected to the pilot flow line 9a. Whereas in the raised or lowered positions the lands 19f for raise or 19e for lower block flow between the annular areaways 20a and 20b and consequently flow of fluid in pilot line 9a to the tank 5.

Gradual increase or decrease of supply of hydraulic fluid to the hydraulic units or reservoir occurs when the control valve spools 19e and 19f on a control valve are moved between the hold and lower positions or between the hold and raised positions. Fine adjustment is effected by the extent of registration of tapered means, such as chamfers on the land or V-shaped notches 33 or 34, with the annular areaways 20a or 20b with respective consequential gradual opening and closing of the poppet 53. FIGURE 3 illustrates the situation midway between hold and raised positions where the pilot flow through pilot line 9a can only pass through a portion of notch 33 to annular areaway 20b. FIGURE 8 illustrates this situation where the pilot flow through pilot line 9a can only pass through a portion of V-shaped notch 34 and annular areaway 20b. It will be appreciated that the greater portion of the area of volume of the V-shaped notch in communication with the areaways 20a and 20b the less will be restriction of flow to the pilot line 9a, the higher the poppet 53 and consequently the greater the flow of fluid directly back to the reservoir by way of bypass valve 9. FIGURE 9 illustrates that another set of V-shaped notches 33, 34 are located 180° removed from the first set. Any number of V-shaped notches in any pattern may be used and also it will be appreciated that the shape of the notches need not be V-shaped but could have another shape as for instance a rectangular shape.

No V-shaped notches are provided on land 19a and 19e to cooperate with the annuli 20a and 20b in the float position of the valve spool 19 and consequently no fine adjustment is available between the float and the lower positions, rather the transfer from float to lower will be very snappy which means the implements which were free floating will be quickly adjusted to a power lower condition or otherwise.

In the float position it will be noted that the control valve spool 19 is so positioned that drain chambers 21 and 22 and raise chamber 23 and lower chamber 24 are all open to drain allowing the involved hydraulic unit to freely float and the feed chamber 25 is blocked by lands 19b and 19c permitting full pump flow to the reservoir 5 by way of unloading valve 9, pilot 9a being entirely open to drain. Movement of the spool 19 to the right would terminate pilot flow to drain. Further movement to the right of spool 19 would open the pressure chamber 25 to the lower chamber 24 by way of the notches 40b of the land 19c with the raised and lowered chambers 23, 24 open to reservoir or return and the pilot line 9a closed to return, as indicated by FIGURE 7 when lowering of the hydraulic unit commences. Continued movement to the right would place the feed chamber 25 in communication with the lower chamber without the use of the notches 40b of the land 19c. Consequently, these notches 40b give a gradual or finely adjusted supply of the fluid to the hydraulic unit for lowering same.

In the lower position raise chamber 23 is open to drain chamber 21 but lower chamber 24 is closed to drain chamber 22 completely, and the unloading valve 9 is seated on seat 55. There is no pump flow to the reservoir via the unloading valve 9 but rather full pump flow from feed chamber 25 is directed to the lower line 2b, 3b or 3c, 4b of the respective hydraulic unit 2, 3 or 4 to the applicable lower unit. With movement of the control valve spool 19 to the pilot line 9a to drain is partially open by a portion of the V-notch 34 of land 19e to partially open the unloading valve dividing the flow mostly to the pump and some to the reservoir by way of the unloading valve 9 with a portion of the raise chamber 23 still open to the drain chamber 21. The feed chamber 25 is still open to the lower chamber 24. Additional movement of the spool 19 to the right opens a greater flow of the pilot line 9a by notch 34 to the reservoir 5, raise chamber 23 communicates with the drain chamber 21 by way of notches 41 of land 19a and eventually is blocked off and flow from the raise chamber 23 to the drain chamber 21 is eventually blocked off completely (see FIGURE 8), flow from the feed chamber 25 to the raise chamber 24 is closed, feed chamber 25 to the lower chamber still open but less and lower chamber 24 to drain chamber 22 blocked with unloading valve 9 open further (as seen in FIGURE 8).

In the hold position pilot line 9a to reservoir has minimum restriction by way of reduced diameter 39 of spool 19 (see FIGURE 1) and raise and lower chambers 23, 24 blocked to drain chambers 23, 24 and feed chamber 25 and reservoir 5. Movement of the spool 19 to the right of the hold position increases restriction of pilot flow to drain because of V-notch 33 (see FIGURE 3) approximately equally dividing pump flow between the hydraulic units and the reservoir because of the corresponding positioning of the unloading valve 9, the raise chamber 23 being open to the feed chamber 25 and the lower chamber 24 being open only to the drain chamber by way of the notches 42 of land 19c for initially starting a finely adjusted raise condition for the hydraulic unit. Further movement of the spool 19 to the right increases pilot line restriction through V-shaped notch 33 with less flow to the reservoir and more to the hydraulic unit by way of the feed chamber 25 to the raise chamber 23 with the lower chamber 24 blocked to the feed chamber 25 and open to a more full drain.

The location of the spool 19 in the raised position ends pilot flow to drain with full pump flow to one or more of the units by way of the feed chamber 25 and raise chamber 23 for raising the associated implement or implements, the lower chamber 24 having a good flow to the drain chamber 22 and reservoir 5.

A feature of this type of unloading valve that is used in our hydraulic circuit is that the pump flow is always directed to the reservoir under a very low pressure until the directional spool is moved to actuate the units or equipment. This manipulation diverts the desired quantity of fluid into the work circuit (either full pump or a portion of it) while the unneeded portion remains directed to the tank. This combination further permits the use of multiple directional valves, sandwiched together or remotely located from each other. With these multiple arrangements, only one unloading valve is required though different size control valves and hydraulic units may be used in series with one another. Since the control valves used need be no larger than their individual hydraulic units require sensitive control of the implement is thereby obtained.

We claim:
1. A valve mechanism for hydraulically controlling by-pass flow having high pressure fluid source means, outlet means having outlet pressure, and an adjustable bleed line, said valve mechanism comprising, in combination with the adjustable bleed line;
   a chambered valve housing structure connected with said bleed line;
   a poppet valve in the chambered valve housing structure;
   actuator means to actuate the poppet valve;
   said chambered valve housing structure having spaced-apart first and second ports in a main fluid circuit, said first port communicating with the high pressure and said second port communicating with the outlet pressure for bypassing the fluid in the main fluid circuit;
   said chambered valve housing structure further having a valve seat for the poppet valve in the main fluid circuit between the first and second ports, there being a longitudinally acting pressure area on one side of the poppet valve communicating with the fluid in the first port and acting in a direction to move the poppet valve from its seat and open the main fluid circuit;
   said actuator means comprising a longitudinally movable piston having an open end, and a pilot chamber, both the piston and the pilot chamber being in the housing structure on the other side of said poppet valve, said pilot chamber being formed between and connecting the open end of the piston and the bleed line and being included in a second fluid circuit hydraulically interconnecting the first port and the bleed line;
   a single orifice in said second fluid circuit and formed as a side slot in the piston, said single orifice being disposed with the long dimension extending in the longitudinal direction of movement of the piston;
   said orifice cooperating with a fixed covering part of the housing structure so as to define a pilot chamber inlet, one end of said orifice extending beyond the corresponding end of the covering part in all positions of the piston and poppet valve to insure at least limited continual communication between the inlet and pilot chamber at all times;
   said piston being connected for movement with the poppet valve and moving in a chamber-volume-increasing direction to cause closure of the poppet valve, said orifice presenting its minimum uncovered dimension when the piston is in a first position corresponding to closure of the poppet valve, and presenting its maximum uncovered dimension when the piston is in a second position corresponding to the open position of the poppet valve and hence presenting maximum entrance area for rapidly charging the pilot chamber so that fast movement toward closure will result;
   said piston moving between the first and second positions into an infinite number of selected intermediate positions of dynamic stability wherein the orifice affords to the pilot chamber an hydraulic equilibrium wherein the replenishing flow through the pilot chamber inlet matches the flow of fluid bled from the pilot chamber through the bleed line; and
   a manually adjusted pilot valve connected in the bleed line comprising a sliding valve with lands having tapered notches at their edges for finely adjusting flow in the bleed line;
   said actuator means being flow sensitive whereby when the pilot valve is manually shifted into positions of fine adjustment, it causes the orifice to adjust the pilot chamber inlet and place the piston and poppet valve in a range of positions of dynamic balance, so as to incrementally regulate the degree of opening of the poppet valve in a decreasing direction with increases in size of the pilot chamber volume, and vice versa.

2. The invention of claim 1, wherein the fixed covering part of the housing structure comprises the covering end portion of a fixed sleeve, said sleeve slidably receiving the longitudinally movable piston, said covering end portion and the orifice being only partially in registry thereby mutually defining the pilot chamber inlet.

3. The invention of claim 1, said piston having a closed end opposite to the open end thereof, and integrally carrying the poppet valve and said longitudinally acting pressure area of said poppet valve.

4. The invention of claim 3, said piston also carrying a tubular extension of the popept valve, which has enlarged side slots therein and the interior of which extension communicates with the second port through said enlarged side slots.

References Cited by the Examiner
UNITED STATES PATENTS

| | | | |
|---|---|---|---|
| 570,727 | 11/96 | Gale | 251—35 X |
| 945,038 | 1/10 | Henkel | 251—35 |
| 1,046,236 | 12/12 | Wagner | 251—35 |
| 2,318,851 | 5/43 | Griffith | 60—97 X |
| 2,319,551 | 5/43 | Linden et al. | 60—97 X |
| 2,542,526 | 2/51 | Holveck et al. | 251—35 X |

EDGAR W. GEOGHEGAN, *Primary Examiner.*

JULIUS E. WEST, SAMUEL LEVINE, *Examiners.*